Oct. 4, 1960 R. E. CLAYTON ET AL 2,955,102
VULCANIZING CHLORINATED ISOOLEFIN-POLYOLEFIN COPOLYMERS
Filed April 5, 1957 2 Sheets-Sheet 1

Robert E. Clayton
John R. Briggs
Francis P. Baldwin

Inventors

By *W. H. Smyers* Attorney

Oct. 4, 1960 R. E. CLAYTON ET AL 2,955,102
VULCANIZING CHLORINATED ISOOLEFIN-POLYOLEFIN COPOLYMERS
Filed April 5, 1957 2 Sheets-Sheet 2

Robert E. Clayton
John R. Briggs
Francis P. Baldwin
Inventors

By *W. H. Smyers* Attorney

United States Patent Office 2,955,102
Patented Oct. 4, 1960

2,955,102

VULCANIZING CHLORINATED ISOOLEFIN-POLYOLEFIN COPOLYMERS

Robert E. Clayton, Roselle Park, John R. Briggs, Westfield, and Francis P. Baldwin, Colonia, N.J., assignors to Esso Research and Engineering Company, a corporation of Delaware Filed Apr. 5, 1957, Ser. No. 651,089

9 Claims. (Cl. 260—79.5)

This invention relates to the vulcanization of chlorinated rubbery copolymers of isoolefins and multiolefins such as chlorinated butyl rubber, and to the resulting compositions formed thereby. More particularly, the present invention relates to curing chlorinated rubbery isoolefin-multiolefin copolymers in the substantial absence of added elemental sulfur by an admixture of at least one bivalent metal oxide, preferably zinc oxide, certain thiuram sulfides and/or thiocarbonates, magnesium oxide and thiazyl sulfides.

The invention will be best understood from the following description read in connection with the accompanying drawings wherein.

Figure 1:
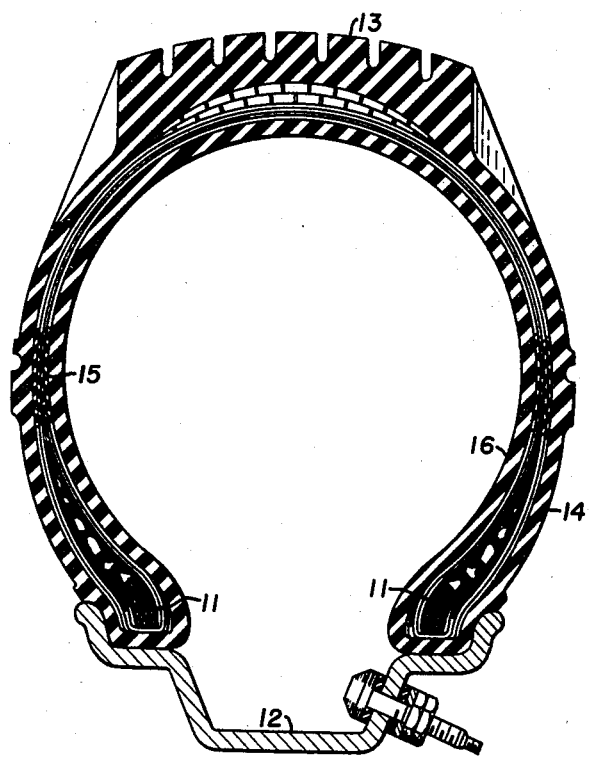
Figure 1 is a vertical section of a pneumatic tubeless tire employing therein chlorinated butyl rubber which has been cured in accordance with the present invention.

It is known that unmodified isoolefin-multiolefin rubbery copolymers or chlorinated isoolefin-multiolefin rubbery copolymers may be cured by heating the same at an elevated temperature in the presence of minor proportions of a combination of curatives comprising an admixture of sulfur, zinc oxide, and thiuram sulfides and/or certain thiocarbamates. It has also been recently discovered that chlorinated isolefin-multiolefin rubbery copolymers, may be cured in the absence of added elemental sulfur in the presence of certain active polymethylol phenol resins by basic metal compounds which are advantageously bivalent metal oxides, of which zinc oxide is preferred. However, the foregoing zinc oxide-ploymethylol phenol cure of chlorinated isoolefin-multiolefin rubbery copolymers results in vulcanizates which heat age only moderately well. Furthermore, the compounded unvulcanized chlorinated copolymer stocks containing zinc oxide and polymethylol phenol resins tend to have only fair scorch resistance.

In accordance with the present invention, it has now been found that chlorinated isoolefin-multiolefin rubbery copolymers, i.e. chlorinated butyl rubber, may be effectively cured into vulcanizates having good heat aging resistance solely by combination of magnesium oxide, zinc oxide, a thiazyl sulfide and either a thiuram sulfide and/or a thiocarbamate, the magnesium oxide being added first to improve scorch resistance. More particularly, the magnesium oxide is mixed with the copolymer prior to the addition of other curatives at a temperature level of between about 130° and 350° F. for a period of time of between about 5 seconds and 5 minutes. Preferably, 100 parts by weight of the unvulcanized, chlorinated isoolefin-multiolefin rubbery copolymer, prior to curing are blended at a temperature level of between about 160° and 300° F. for between about 10 seconds to 3 minutes in the substantial absence of added elemental sulfur with about 0.1 to 10.0 and preferably about 0.3 to 5.0 parts by weight of magnesium oxide. In the case where the preliminary blending or mixing is performed on a mill or in a Banbury, such mixing means is then regulated to a temperature level of between about 100° and 250° F. and preferably between about 130° and 220° F. and the magnesium oxide-containing stock then compounded in the substantial absence of added elemental sulfur with about 0.5 to 30, preferably about 1.0 to 20 parts by weight of zinc oxide, about 0.01 to 10.0, advantageously about 0.1 to 6.0, preferably about 0.3 to 4.0 parts by weight of a curing aid such as a thiuram sulfide and/or a thiocarbamate, and about 0.05 to 10.0, preferably about 0.5 to 6.0 parts by weight of a thiazyl sulfide. The resulting composition is then subsequently vulcanized, also in the substantial absence of added elemental sulfur, as more fully described hereinafter. More particularly, the above new and useful vulcanizable compositions are then cured in the substantial absence of added elemental sulfur at a temperature level of from between about room temperature to about 450° F., advantageously between about 200° and 400° F., preferably between about 250° and 400° F. for a period of time of between about 0.05 minute up to about several hours or more, preferably for about 0.1 minute to about 5 hours, to give improved vulcanizates having outstanding heat aging resistance.

The thiuram sulfides found particularly useful for the purposes of the present invention include, among others, $C_1$ to $C_{10}$ alkyl (or $C_6$ to $C_{12}$ aryl, aralkyl or alkaryl) thiuram sulfides such as tetramethyl thiuram monosulfide, tetramethyl thiuram disulfide, tetraethyl thiuram disulfide, tetrabutyl thiuram disulfide, tetraamyl thiuram disulfide, di-N-pentamethylene thiuram tetrasulfide, tetraphenyl thiuram disulfide, tetrabenzyl thiuram disulfide, N-dimethyl-N'-phenyl aminoethyl-N'-phenyl thiuram disulfide, mixtures thereof, etc.

The thiocarbamates found to be particularly useful for the purposes of the present invention include, among others, such materials as metal or amine salts of thiocarbamic acids such as tellurium diethyl dithiocarbamate; zinc dimethyl dithiocarbamate; copper dimethyl dithiocarbamate; cadmium diamyl dithiocarbamate; zinc dibutyl dithiocarbamate; selenium dipropyl dithiocarbamate; lead dimethyl dithiocarbamate; bismuth dimethyl dithiocarbamate; lead (phenylaminoethyl) phenyl dimethyl dithiocarbamate; 2,4-dinitrophenyl dimethyl dithiocarbamate; potassium diethyl dithiocarbamate; lead (-o-tolyl-aminoethyl)-o-tolyl dimethyl dithiocarbamate; zinc-N-pentamethylene dithiocarbamate; zinc dibenzyl dithiocarbamate; N-pentamethylene ammonium pentamethylene dithiocarbamate; zinc (phenyl aminoethyl) phenyl dimethyl dithiocarbamate; mixtures thereof, etc.

The thiazyl sulfides useful for the purposes of the present invention include among others, benzothiazyl disulfide, bis-4,5-dimethyl thiazyl disulfide, zinc benzothiazyl sulfide, dinitrophenyl benzothiazyl sulfide, benzyl hexamethylene tetrammonium-2-benzothiazyl sulfide, phenyl aminomethyl-2-benzothiazyl sulfide, mixtures thereof, etc.

Also, the foregoing novel vulcanizable chlorinated rubbery copolymer-containing compositions, which are preferably chlorinated butyl rubber-containing compositions, may be blended with, prior to vulcanization, conventional amounts of carbon blacks, mineral fillers such as clays, silica, talc, diatomaceous earth, plasticizers, glycols, resins, waxes, organic esters, extender oils, anti-oxidants or the like.

The chlorinated rubbery isoolefin-multiolefin copolymers to be used may be made by mild chlorination of the synthetic rubber as more fully described hereinafter. The synthetic rubber to be chlorinated is advantageously a high molecular weight copolymer of a major proportion of an isoolefin and a minor proportion of a multiolefin. Copolymers of the above general type, having Staudinger molecular weights between about 20,000 and 300,000 and iodine numbers of between about 0.5 and 50 (Wijs), especially where the copolymer contains about 85 to 99.5 weight percent of a $C_0$ to $C_8$ isoolefin such as isobutylene, 2-methyl-1-butene, 3-methyl-1-butene, or the like, with about 15 to 0.5 weight percent of a multiolefin of about 4 to 14, preferably about 4 to 6 carbon atoms, are commonly referred to in patents and in technical literature as "butyl rubber" or GR–I rubber (Government Rubber-Isobutylene). For instance, the preparation and uses of butyl-type rubbers are described in U.S. Patent 2,356,128 to Thomas et al. and in the book "Synthetic Rubber" by G. S. Whitby. The rubber preferably comprises the reaction product of isobutylene with a conjugated diolefin such as isoprene, butadiene, dimethyl butadiene, piperylene or such multiolefins as cyclopentadiene, dicyclopentadiene, cyclohexadienes, dimethallyl, allo-ocymene, vinyl fulvenes, etc. The reaction product of isobutylene and isoprene is preferred.

The above-described rubbery copolymer, which is preferably butyl rubber, is then chlorinated in a manner which does not degrade the molecular weight thereof, but sufficiently to produce a rubber which retains its tensile strength upon heat aging. The chlorination is preferably carried out so as to make the resulting chlorinated butyl rubber contain about at least 0.5 weight percent (preferably at least about 1.0 weight percent) combined chlorine, but not more than about "X" weight percent combined chlorine wherein:

$$X = \frac{35.46L}{(100-L)M_1 + L(M_2+35.46)} \times 100$$

and:

$L$ = mole percent of the multiolefin in the polymer
$M_1$ = molecular weight of the isoolefin
$M_2$ = molecular weight of the multiolefin
35.46 = atomic weight of chlorine Restated, there should be at least about 0.5 weight percent of combined chlorine in the polymer but not more than about one atom of chlorine combined in the polymer per molecule of multiolefin present therein; i.e., not more than about one atom of combined chlorine per double bond in the polymer. Normally, the chlorine content of the chlorinated polymer should be within about 0.1 to 10.0 weight percent, preferably about 0.5 to 3.0 weight percent chlorine based on polymer.

Suitable chlorinating agents which may be employed are molecular chlorine, alkali metal hypochlorites, sulfur chlorides, chlorohydantoins, pyridinium chloride perchloride, N-chloro-succinimide, alpha-chloroacetoacetanilide, iodine monochloride, trichlorophenol chloride, N-chloroacetamide, beta-chlor-methyl phthalimide and other common chlorinating agents. The preferred chlorinating agents are molecular chlorine, sulfuryl chloride, and chlorohydantoins.

The chlorination is conducted at temperatures of from above about 0° to about 100° C. and preferably at about 20° to 80° C. for about one minute to several hours, the temperature and time being regulated to chlorinate the rubbery copolymer to the extent above-mentioned. The pressure may vary from about 0.5 to 500 p.s.i.a., atmospheric pressure being satisfactory.

It has been found that at these chlorination conditions, for every chlorine atom combined with and retained in the polymer, approximately one hydrogen atom evolves from the polymer. When molecular chlorine, or compounds liberating molecular chlorine (at the reaction conditions) are used in the presence of substantially inert solvents, about one mole of HCl is liberated per one mole of chlorine consumed and per gram atom of chlorine retained in the polymer. When other chlorinating agents, containing one or more reactive chlorine atoms per mole in the form of combined chlorine are used, such as N-chloroacetamide, N-chlorosuccinimide, N,N'-dimethyl dichlorohydantoin, etc., at least some of the hydrogen atoms removed from the polymer (which amount to about one hydrogen atom per chlorine atom entering the polymer) may combine with the residue of the chlorinating agent. These proportions of chlorine being combined with the polymer, and hydrogen being removed from the polymer, are a strong indication that the chlorination takes place essentially by hydrogen substitution.

Also, in the case of using molecular chlorine as the chlorinating agent, and at the conditions stated above, it is highly preferable and in many cases necessary (such as when employing elemental chlorine in a completely inert solvent and under conditions such that all of the chlorine is consumed) to limit the amount of chlorine present in the reaction mixture so as not substantially to exceed about two times the amount of chlorine which will be retained in the rubbery copolymer. If this amount of chlorine in the reaction mixture is substantially exceeded, more chlorine than one atom per double bond in the polymer tends to enter the polymer causing rapid degradation therof. In the case of less reactive chlorinating agents containing combined chlorine, the proportions of chlorine added to the reaction mixture may be a greater multiple of that retained in the polymer, say from above about 2 to about 5 times that retained in the polymer, depending on the reactivity of the chlorinating agent so as to establish reasonable chlorination rates on the basis of the law of mass action such as will not tend to subsubstantially degrade the polymer. Also, obviously when chlorinating with elemental chlorine in a solvent medium capable of reaction with chlorine, higher concentrations of chlorine than about 2 times that which will be retained in the copolymer may be used; such concentrations depending on the relative reactivity and concentration of the solvent and polymer respectively, under the reaction conditions used.

The chlorination of the rubbery copolymer may be accomplished in various ways. One process comprises preparing a solution of the copolymer as above, in a suitable inert liquid organic solvent such as an inert hydrocarbon or advantageously halogenated derivatives of saturated hydrocarbons, examples of which are hexane, heptane, naphtha, kerosene, straight run mineral spirits, benzene, toluene, chlorobenzene, chloroform, trichloroethane, carbon tetrachloride, etc., and adding thereto chlorine or other chlorinating agent, optionally in solution, such as dissolved in an alkyl chloride, carbon tetrachloride, etc. Another variation comprises employing the chlorinating agent in the form of a gas, and contacting the gas with a solution of the copolymer. The use of elevated or depressed pressures is optional since atmospheric pressure is satisfactory, although the pressure may vary, depending upon the foregoing temperatures and times from about 1 to 500 p.s.i.a.

The concentration of the copolymer, such as butyl rubber, in the solvent will depend upon the type of reactor, molecular weight of the rubbery copolymer, etc. In general, the concentration of a butyl rubber having a viscosity average molecular weight of about 50,000 to about 2,000,000, preferably about 200,000 to about 1,500,000, if the solvent is a substantially inert hydrocarbon, will be between about 1 and 80% by weight, preferably about 5 to 40%. If chlorine gas is employed, it may also be diluted with up to about 20 times its volume, preferably about 0.1 to 5.0 times its volume of an inert gas such as nitrogen, methane, ethane, carbon dioxide, etc.

In the case of chlorinating butyl rubber with gaseous chlorine in batch procedure, the chlorine is preferably added relatively slowly (e.g., over a period of time of about 1 to 30 minutes) to a preformed solution of the butyl rubber with agitation. For a continuous process, preformed butyl rubber in solution, and gaseous elemental chlorine are advantageously contacted in an orifice mixing zone or preferably a multiple orifice mixing zone of any commercially available type wherein the butyl solution passes consecutively through a plurality of orifices, the chlorine gas being advantageously bubbled into the butyl rubber solution at one or more points. Alternatively, a plurality of agitated reaction zones in series may be employed, wherein the chlorine is added to the first zone, or the process staged, so as to increase the chlorine content in each zone to the final chlorine concentration desired.

The resulting chlorinated rubbery copolymer, such as butyl rubber, may be recovered in various manners. The copolymer may be precipitated with acetone or an alcohol or any other known non-solvent for the rubber and dried under about 1 to 760 millimeters or higher of mercury pressure absolute, at temperatures of about 0° to 180° C., preferably about 50° to 150° C. (e.g. 70° C.). Other methods of recovering the chlorinated rubbery copolymer, from the hydrocarbon solution of the same, are by conventional spray or drum drying techniques. Alternatively, the chlorinated rubbery copolymer-containing solution may be injected into a vessel containing agitated water heated to a temperature sufficient to flash off the hydrocarbon solvent and form an aqueous slurry of the rubbery chlorinated copolymer. This copolymer may then be separated from the slurry by filtration, dried and recovered as a "crumb" or as a dense sheet or slab by conventional milling and/or extruding procedures.

The chlorinated copolymer formed advantageously has a viscosity average molecular weight between about 250,000 and 2,000,000 (i.e., about 10,000 to 150,000 Staudinger) and a mole percent unsaturation between about 0.2 to 15.0, preferably about 0.5 to 5.0. The copolymer before curing may be further compounded with various fillers such as carbon blacks, clays, silica, or titanium dioxide, etc. as well as with plasticizers which are preferably hydrocarbon plasticizer oils, antioxidants, waxes, organic phosphates, resins, etc.

In order to more fully illustrate the present invention, the following experimental data are given.

CHLORINATED BUTYL RUBBER "A"

One run was made chlorinating butyl rubber. The butyl rubber employed was a commercial butyl rubber corresponding to GR–I–18 rubber. Such a rubber is produced by employing in the polymerization feed about 2.5 weight percent isoprene and about 97.5% isobutylene. The butyl rubber had an eight minute Mooney viscosity at 212° F. of 71.0, a mole percent unsaturation of 1.47, a viscosity average molecular weight of 420,000, and contained about 0.25 weight percent based on rubber of N-lauroyl-p-amino phenol antioxidant.

The chlorination of a solution of the above uncured butyl rubber was conducted in a 500-gallon glass-lined Pfaudler reactor, equipped with an agitator, baffle, submersed stainless steel sparger ring and a conduit leading into said ring.

The solvent for the butyl rubber was as follows:

| Component: | Volume percent |
|---|---|
| 2,2-dimethyl butane | 0.1 |
| 2,3-dimethyl butane | 2.40 |
| 2-methyl pentane | 10.75 |
| 3-methyl pentane | 12.45 |
| n-Hexane | 44.85 |
| Methyl cyclopentane | 20.5 |
| 2,2-dimethyl pentane | 0.4 |
| Benzene | 7.7 |
| Cyclohexane | 0.85 |

Gaseous chlorine was continuously added to the butyl rubber solution over a period of one-half hour at a temperature level of 30° C. and under about 25 p.s.i.g. pressure. The chlorine was added to the reactor through the conduit via the sparger ring which, as hereinbefore mentioned, was immersed below the liquid level of the agitated butyl rubber solution. The chlorination was then terminated and the solution, containing the chlorinated butyl rubber formed, agitated for an additional 15 minutes. The resulting solution of chlorinated butyl rubber was then water-washed three times to remove dissolved hydrogen chloride, the last water-wash containing enough NaOH to render the resulting wash-water neutral. There was then added to the solution 0.2 pound per 100 pounds of chlorinated butyl rubber as a 10 weight percent solution in hexane of an antioxidant (2,6-di-tertiary butyl para cresol).

The absolute amounts of butyl rubber, solvent and gaseous chlorine added, as well as the calculated percent of added chlorine based on polymer and resulting percent of chlorine combined in the polymer were as follows:

| | |
|---|---|
| Pounds of butyl rubber | 1200 |
| Pounds of solvent | 6800 |
| Pounds of chlorine added | 33 (i.e. 2.75%) |
| Percent chlorine combined in the polymer | 1.29 |

The resulting water-washed solution containing the chlorinated rubbery butyl product "A" was then recovered by injecting the dissolved chlorinated polymer into an agitated aqueous solution containing a commercial wetting agent of the aliphatic poly oxyethylene ether type (Sterox A.J.) in an amount of about 0.1 lb. per 100 lbs. of chlorinated rubber as a dispersing aid. The solution also contained about 0.5 lb. of zinc stearate (an anti-tack agent) per 100 lbs. of chlorinated butyl rubber; the hot agitated aqueous solution containing 5,000 lbs. of water per 100 lbs. of chlorinated butyl rubber.

The agitated solution was maintained at a temperature of about 185° F. whereby to flash off the solvent and form an aqueous slurry of the chlorinated butyl rubber in water. This slurry was then filtered and chlorinated butyl rubber "A," which was in the form of a wet "crumb," was fed to a dewatering extruder where the water content was reduced to about 5% by weight. The extrudate was then fed to a degassing extruding means where the water content was reduced to below 0.5% by weight. The Mooney viscosity (8 minutes at 212° F.) for the resulting chlorinated butyl rubber "A" (as finished) was 67.

Example I

Three master batches containing chlorinated butyl rubber "A" were formulated. Each master batch contained, per 100 parts by weight of total rubber, 60 parts by weight of HAF carbon black 1 part by weight of stearic acid, 3 parts by weight of 2,6-dimethylol-4-octyl phenol resin, 5 parts by weight of a hydrocarbon plasticizer oil derived from a naphthenic base crude oil and having a specific gravity of 0.90, a flash point by the open cup method of 445° F., a viscosity in S.S.U. at 100° F. of 510, a viscosity in S.S.U. at 210° F. of 55, and an iodine number of 16 cg./g., 1 part by weight of 2,2′-methylene bis(4-methyl-6-tertiary butyl phenol), and various amounts of neoprene-W rubber and magnesium oxide. The master batches were mixed in a Banbury at 275° F. for 8 minutes prior to subsequent compounding. The proportions of ingredients not above specified which were mixed in the Banbury were as follows:

| Component | Parts by weight | | |
|---|---|---|---|
| | Batch A | Batch B | Batch C |
| Chlorinated butyl rubber "A" | 98 | 98 | 100 |
| Neoprene-W rubber | 2 | 2 | |
| Magnesium oxide | | 1 | 1 |

Five rubber stocks were compounded on a rubber mill having a roll temperature of 120° F., each stock containing 2.0 parts by weight of benzothiazyl disulfide, 1.0 part by weight of tetramethyl thiuram disulfide, 3.0 parts by weight of zinc oxide, and the various additional materials listed hereinafter. All compounded stock were then tested for Mooney scorch in minutes at 260° F., the time recorded in minutes being the period when a reading of 5 points above the minimum value was observed. The additional compounding data and Mooney scorch values were as follows:

| Component | Parts by weight | | | | |
|---|---|---|---|---|---|
| Rubber Stock No | 1 | 2 | 3 | 4 | 5 |
| Master batch A | 170 | | | 170 | |
| Master batch B | | 171 | | | 171 |
| Master batch C | | | 171 | | |
| Magnesium oxide | | | | 4 | 3 |
| Mooney scorch (minutes) | 5 | 26 | 30 | 8 | 27 |

The above data show that when chlorinated butyl rubber is first mixed with magnesium oxide and then compounded with a combination of zinc oxide, benzothiazyl disulfide, and tetramethyl thiuram disulfide, good Mooney scorch resistance values of 26 to 30 minutes are obtained (see rubber stock Nos. 2, 3 and 5). The omission of magnesium oxide (stock No. 1) or the failure to add at least part of the magnesium oxide to the chlorinated butyl rubber before adding the curatives (stock No. 5) results in poor Mooney scorch values of about 5 to 8 minutes.

*Example II*

Rubber stocks 3 and 5 were vulcanized at 320° F. for 60 minutes and compared to a typical polymethyl-phenol resin type cure both before and after a very severe aging test in which all vulcanizates were aged for 16 hours at 380° F. in a circulating air oven. The compounding data for the polymethylol-phenol resin cure and the stress-strain data and tear strength in pounds per inch of thickness were as follows:

Polymethylol phenol resin cure:    Parts by weight
Chlorinated butyl rubber "A" ---------------- 100
4-octyl phenol-formaldehyde reaction product
  (alkali catalyzed) ------------------------- 5
Hydrocarbon plasticizer oil (see Example I) -- 5
2,2-methylene bis (4-methyl-6-tertiary butyl
  phenol) ---------------------------------- 1
Stearic acid ------------------------------ 1
2,6-dimethylol-4-octyl phenol resin --------- 3
HAF carbon black ------------------------ 60

The foregoing master batch was mixed in a Banbury at 275° F. for 8 minutes prior to cooling the same to 120° F. and adding three parts by weight of zinc oxide. The physical properties of all vulcanizates before and after aging were as follows:

| Original Properties | Stock 3 | Stock 5 | Resin cure |
|---|---|---|---|
| Tensile strength (p.s.i.) | 2,265 | 2,170 | 1,850 |
| Elongation (percent) | 475 | 465 | 305 |
| Modulus at 300% Elong. (p.s.i.) | 1,430 | 1,450 | 1,350 |
| Tear (lbs./inch) | 320 | 285 | 115 |

| Properties after Aging | Stock 3 | Stock 5 | Resin cure |
|---|---|---|---|
| Tensile strength (p.s.i.) | 1,190 | 1,230 | 220 |
| Elongation (percent) | 330 | 305 | 260 |
| Modulus at 300% Elong. (p.s.i.) | 1,120 | 1,200 | |
| Tear (lbs./inch) | 170 | 160 | 40 |

The data show that chlorinated butyl rubber which has been first blended with magnesium oxide and then cured in the substantial absence of added elemental sulfur by a combination of zinc oxide, a thiuram sulfide, and a thiazyl sulfide, upon severe aging results in vulcanizates still possessing tensile strengths above 1000 p.s.i. and tear strengths in excess of 150 lbs./inch whereas a similar polymethylol phenol cure aged as above shows only a tensile strength of 220 p.s.i. and a tear strength of 40 lbs./inch.

*Example III*

A commercial unmodified butyl rubber curing bladder stock and a commercial curing bladder stock known as the "Vanderbilt" stock were each compared to rubber stock 5 of the present invention as to Mooney scorch at 260° F. and retention of physical properties of vulcanizates cured at 320° F. for 60 minutes which had been aged for 16 hours at 380° F. in a circulating air oven. The results were as follows:

| Original Properties | Stock 5 | Vanderbilt Stock | Commercial unmodified butyl stock |
|---|---|---|---|
| Mooney scorch at 260° F | 27 | 16 | 5 |
| Tensile strength (p.s.i.) | 2,170 | 1,300 | 1,800 |
| Elongation (percent) | 465 | 320 | 410 |
| Modulus at 300% elong. (p.s.i.) | 1,450 | 1,285 | 1,320 |
| Tear (lbs./inch) | 285 | 115 | 215 |

| Properties after aging | Stock 5 | Vanderbilt Stock | Commercial unmodified butyl stock |
|---|---|---|---|
| Tensile strength (p.s.i.) | 1,230 | 245 | 440 |
| Elongation (percent) | 305 | 505 | 290 |
| Modulus at 300% elong. (p.s.i.) | 1,120 | 125 | |
| Tear (lbs./inch) | 170 | 60 | 80 |

The above data show that the magnesium oxide containing compositions are less scorchy and age better than commercially available curing bladder stocks.

A particularly advantageous use for chlorinated butyl rubber containing compositions of the present invention is pneumatic tires of either the inner tube containing variety or in tubeless type tires. Referring now to the drawings, Figure 1 depicts a pneumatic tubeless tire which comprises a hollow toroidal type member which is substantially U shaped in cross-section by virtue of an open portion which extends around the inner periphery of the member. In other words, the tire is of a tubeless type structure which has a cross-section in the form of an open-bellied body with spaced terminal portions to define a member generally resembling a horseshoe. The terminal portions constitute the bead portions 11—11 of the tire inside of which are a plurality of bead wires adhesively embedded and molded in a rubber. The outer surface of the bead portion is advantageously formed into an air-sealing means to aid in adhesion to rim 12 when the tire is inflated. Typical air sealing means may comprise a layer of rubber disposed on the outer surfaces of the bead portions. This layer will generally vary in thickness between about 0.02 to 0.5 inch and comprise a vulcanized rubber or rubbers having a relatively low compression or permanent set. Alternatively, the outer surfaces of the bead portions may contain a plurality of ribs or, if these surfaces are smooth, the tire rim may be roughened (for example by sand-blasting) and/or ribbed circumferentially or both circumferentially and radially in those areas where the outer surfaces of the tire bead portions contact the rim.

In any of the foregoing types of sealing means, a gumbo, dope or cement comprising a soft, tacky, rubbery composition may be applied to the outer surfaces of the bead portions and/or the tire rim prior to mounting the tire. In any case, the air-sealing means advantageously contains the modified copolymers in acordance with the invention; the particular structural details of the tire or rim surfaces not constituting a part of the present invention. The outer surface of the tire also includes tread area 13 and sidewalls 14. The open portion of the horseshoe-shaped tire faces that portion of the inner circumference of the tire which is adjacent the said tread area 13 of the tire.

The remaining construction of the tire may vary according to conventional fabrication, but in general the tire is a multi-layered type of structure with an outer layer as above-mentioned. The layer next adjacent the outer layer generally comprises a carcass 15 which includes a rubber which has incorporated therein a fabric composed of a plurality of cotton, rayon, steel or nylon cords, etc. The tire also includes an inner lining 16 and/or a tie-ply advantageously made from rubber, e.g. chlorinated butyl rubber which has been at least partially vulcanized in the substantial absence of elemental sulfur for about 1 to 60 minutes at about 100° to 400° F. in accordance with the invention in the presence of magnesium oxide, zinc oxide, thiocarbamates or thiuram sulfides and thiazyl sulfides. This inner lining must be substantially impermeable to air. The above multi-layers, at least three in number, are conventionally bonded or otherwise adhered together, for example, by cementing and/or especially by vulcanizing in the presence of magnesium oxide, zinc oxide, thiocarbamates or thiuram sulfides and thiazyl sulfides according to the invention, to form a tire of a unitary structure.

The substantially sulfur-free compositions of chlorinated isoolefin-multiolefin copolymers, particularly butyl rubber (with or without other rubbery polymers) with magnesium oxide, zinc oxide, thiazyl sulfides and thiuram sulfides or thiocarbamates of the present invention, may be employed generally throughout the tire. For example, the inner lining 16 may comprise chlorinated isoolefin-multiolefin copolymers containing about 85% to 99.5% of combined isoolefin and about 15 to 0.5% of combined multiolefin, especially chlorinated butyl rubber, vulcanized or covulcanized with other rubbery polymers in the presence of the foregoing materials in accordance with the invention. Alternatively, the inner lining 16 may comprise ordinary butyl rubber which has been bonded to carcass 15 by an interposed tie-ply of chlorinated isoolefin-multiolefin copolymers, particularly chlorinated butyl rubber which has been preferably vulcanized or covulcanized with other rubbery polymers in the presence of magnesium oxide, zinc oxide, thiazyl sulfides, and thiuram sulfides or thiocarbamates such as outlined hereinbefore in accordance with the invention in the substantial absence of elemental sulfur. Such an interposed tie-ply facilitates the inclusion of highly unsaturated rubbers such as natural rubber, GR–S rubber, Buna-N rubber, mixtures thereof, etc. in the carcass.

The other layers of the tire, such as the intermediate carcass layer and/or the outer layer (including the tread area, the sidewall and the outer bead portions, etc.), may also comprise chlorinated butyl rubber vulcanized or covulcanized with other rubbery polymers in the presence of magnesium oxide, zinc oxide, thiazyl sulfides and thiuram sulfides or thiocarbamates in accordance with the invention. Vulcanization of the carcass, plies (if any), sidewalls, and tread area is advantageously accomplished by heating the same for about 3 to 60 minutes or more at about 250° to 400° F.

The tubeless tire may also contain, in at least the tread area 13, an oil-extended high molecular weight (e.g. viscosity average molecular weight of about 900,000 to about 2,000,000) butyl rubber or chlorinated butyl which has been bonded to a more highly unsaturated rubber (or rubbers) in carcass 15 by an interposed tie-ply of a chlorinated isoolefin-multiolefin copolymer, particularly chlorinated butyl rubber, which has been advantageously vulcanized or covulcanized with other rubbery polymers in the presence of magnesium oxide, zinc oxide, thiuram sulfides, and thiocarbamates and/or thiuram sulfides in accordance with the invention.

Other especially desirable embodiments of the present invention comprise the use of chlorinated isoolefin-multiolefin-containing copolymers, particularly chlorinated butyl rubber, which have been compounded and cured in accordance with the present invention, in curing bags, particularly tire casing curing bags or tire casing curing diaphragms or bladders such as those used in Bag-O-Matic presses. Such tire curing bags or curing bladders have a combination of relatively severe requirements. One of such requirements concerns processing. For instance, in the manufacture of curing bladders, the compound is first formed into a relatively massive step which is between about one and two and one-half inches thick preferably about 1.5 to 2.0 inches thick and between about 3 and 5 inches wide, preferably about 3.5 to 4.5 inches wide. With compounded rubber stocks such as have heretofore been in general use, it is necessary to form this mass by plying it up from thin strips, which have been preferably processed on a cool calender, since such prior art compositions are relatively scorchy. However, when using the chlorinated butyl rubber compositions of the present invention which have been subjected to a preliminary blending with magnesium oxide, such massive strips may be directly extruded or otherwise processed in a single forming operation which is much more economical and faster than the methods of the prior art involving plying up such masses. The reason why such compositions in accordance with the present invention may be extruded with facility is that they have good scorch resistance and are substantially void from incipient cure, gelation or prevulcanization during extrusion and during the time required for such a thick mass to cool down after extrusion.

Another processing step where the good scorch resistance of the compositions containing chlorinated butyl rubber and magnesium oxide of the present invention stand out is during the molding of curing bags and curing bladders. In the case of curing bladders, the thick massive strip referred to hereinbefore, is cut into a predetermined length and the two ends spliced together and placed in the press to be formed into the shape of the curing bladder. The compositions of the present invention have been found to be readily shaped without scorching (during such a forming operation). Also, premature vulcanization during such forming or shaping has not been encountered.

The use requirements for the finished curing bags and bladders are also particularly severe. In the case of curing bladders it must be stiff enough to form the tire properly yet flexible enough to be distorted considerably. More particularly, when the tire curing press is in position to receive the uncured or "green" tire, the curing bladder is in the configuration of a generally cylindrical form having folds generally running lengthwise thereof. These folds are due to the fact that at this stage the curing bladder is under vacuum to make it small enough that the unvulcanized tire may be placed over it easily. After the unvulcanized tire is in position, the tire mold is closed and a heating medium such as steam is injected into the bladder. This forces the bladder against the tire and the tire against the press which molds the tire into the desired form. More steam is then injected into the bladder which forces the bladder still tighter against the unvulcanized tire and forces the tire firmly against the mold matrix so that the proper design is molded into the tire. Heretofore, the maximum steam temperature permissible for curing bladders has been about 340° F. whereas temperatures of 360° F. or 380° F. or higher may be used when employing the compositions of the present invention. This has permitted considerably shortened times for curing tires in the mold.

After the tire has been cured in situ in the mold, the mold is opened and the bladder collapsed from the tire by vacuum. The bladder is maintained in this collapsed position while the cured tire is being removed from the mold and while the next unvulcanized tire is inserted. Since this cycle is repeated many times using the same curing bladder, such a bladder must maintain good flexibility to stand up. It has been found that the compositions of the present invention adequately meet such requirements and that, in fact, tire curing bladders or curing bags produced in accordance with the present invention outlast presently available commercial compounds manufactured for use in such curing bags and bladders.

Figure 2:
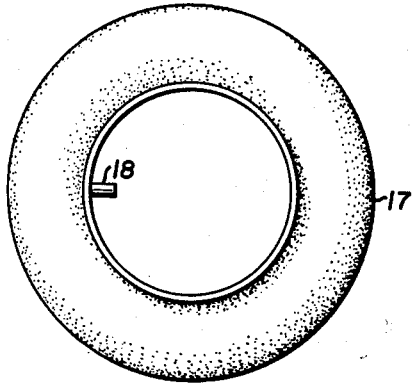
Figure 2 is a view in side elevation of a tire casing curing bag, formed of a material comprising a modified copolymer cured in accordance with the present invention.

Figure 2 of the accompanying drawings illustrates a tire curing bag made of such a chlorinated isoolefin-multiolefin-containing copolymer, in accordance with the present invention, which has been advantageously compounded into the following recipe or its equivalent:

| Component | Parts by weight | |
|---|---|---|
| | Typical Range | Preferred Range |
| Chlorinated isoolefin-multiolefin copolymer | 100 | 100 |
| Magnesium oxide | 0.1–10.0 | 0.3–5.0 |
| Benzothiazyl disulfide | 0.5–10.0 | 0.5–6.0 |
| Zinc oxide | 0.5–30.0 | 1.0–20.0 |
| Filler [1] | 30–80 | 40–60 |
| Tetramethyl thiuram disulfide | 0.2–4.0 | 0.3–3.0 |
| Tellurium diethyl dithiocarbamate | 0.2–4.0 | 0.3–3.0 |
| Die-anti-tack agent (e.g. stearic acid) | 0–5 | 0.5–2.0 |
| Phenolic resin | 0–20 | 0–15 |
| Antioxidant (e.g. 2,6-di-tertiary (buta para cresol) | 0–5 | 0.1–3.0 |

[1] The filler advantageously comprises any suitable rubber grade carbon black such as furnace, channel or thermal blacks and/or mineral fillers such as clays, talc, alumina, silica, diatomaceous earth, etc.

The above compounded stock is shaped into the form of curing bag 17 in accordance with conventional practice as outlined above and is then cured in a mold at temperatures between about 280° and 400° F. for a period of time ranging between about 10 minutes and 2 hours, the lower the temperature the longer the curing time and vice versa. Referring again to Figure 2, tire curing bag 17 is of an annular toroidal form having an external shape corresponding approximately to the interior contour of the pneumatic tire casing or inner liner to be cured thereon, and is equipped with the usual connecting valve 18 by means of which a heated fluid under pressure, such as hot water and/or steam is introduced into the interior cavity of the bag during the vulcanization of the tire. The tire curing bag is thereby expanded, causing the tire to conform closely to the surfaces of the mold cavity in which the tire is vulcanized. Such a curing bag, produced in accordance with the present invention, is, as above-mentioned, superior to conventional curing bags in its resistance to deteriorating influences.

Figure 3:
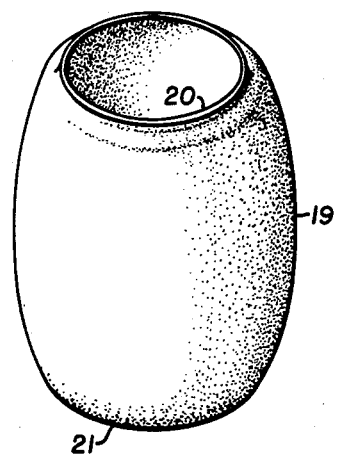
Figure 3 is a perspective view of a tire casing curing diaphragm or bladder as provided in the structure of a Bag-O-Matic press and containing therein a modified copolymer cured in accordance with the present invention.

Figure 3 shows a hollow cylindrical curing bladder or diaphragm 19 useful in a Bag-O-Matic tire press. The top 20 and bottom 21 of the diaphragm are sealed when in position on the press by a combination of bead and clamping rings (not shown) which also form the bead area of the tire mold. A Bag-O-Matic tire press is illustrated and described on page 314 and pages 318 to 319 in "Machinery and Equipment for Rubber and Plastics," vol. I; "Primary Machinery and Equipment" (1952, compiled by R. G. Seaman and A. M. Merrill) to which reference may be had for further details. The compounding of chlorinated butyl rubber is essentially the same as for tire curing bags outlined above.

Other embodiments of the present invention comprise the use of chlorinated isoolefin-multiolefin-containing copolymers, particularly chlorinated butyl rubber copolymers, which have been compounded and vulcanized in accordance with the present invention, in conveyor belting, transmission belting and steam hose. The excellent heat-aging resistance properties of vulcanizates of chlorinated isoolefin-multiolefin rubbery copolymers, which have been compounded and cured in accordance with the present invention, makes them particularly adaptable for use in steam hose and conveyor belting where, in each instance, the transport of hot materials is involved.

Figure 4:
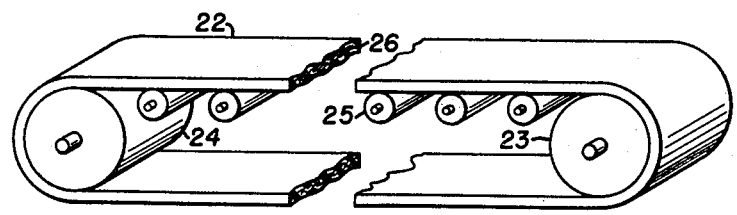
Figure 4 is a generally edgewise perspective view of a conveyor belt structure in which the belt is formed of a modified copolymer material cured in accordance with the present invention.

Figure 4 shows a conveyor belt 22 containing a chlorinated rubbery isoolefin-multiolefin-containing copolymer vulcanized in accordance with the present invention, said belt being in position on drive roller 23, idle roller 24, and idle support rollers 25. The belt may consist wholly of a chlorinated isoolefin-multiolefin-containing rubbery copolymer, particularly chlorinated butyl rubber compounded and vulcanized in accordance with the present invention, but preferably contains embedded therein a fabric 26 composed of a plurality of plies of cotton, rayon, nylon or steel filaments, cords or threads. A suitable formulation for compounding chlorinated isoolefin-multiolefin-containing copolymers for use in either conveyor belting or in steam hose is as follows:

| Component | Parts by weight | |
|---|---|---|
| | Typical Range | Preferred Range |
| Chlorinated isoolefin-multiolefin copolymer | 100 | 100 |
| Magnesium oxide | 0.1–10.0 | 0.3–5.0 |
| Benzothiazyl disulfide | 0.5–10.0 | 0.5–6.0 |
| Zinc oxide | 0.5–30.0 | 1.0–20.0 |
| Filler [1] | 40–120 | 50–80 |
| Tetraethyl thiuram disulfide | 0.2–4.0 | 0.3–3.0 |
| Zinc dimethyl dithiocarbamate | 0.2–4.0 | 0.3–3.0 |
| Phenolic resin | 0–20 | 0–15 |
| Die anti-tack agent (e.g. magnesium stearate) | 0–5.0 | 0.5–2.0 |
| Antioxidant; e.g. 2,2'-methylene bis(4-methyl-6-tertiary butyl phenol) | 0–5.0 | 0.1–3.0 |

[1] The filler may comprise rubber grade oxy or non-oxy carbon blacks such as channel, furnace or thermal blacks and/or mineral fillers such as clays, talc, alumina, silica, silica-alumina, diatomaceous earth, etc.

Figure 5:
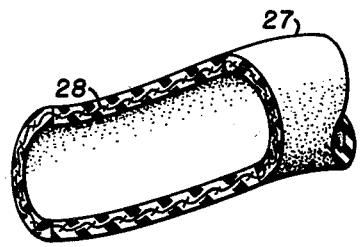
Figure 5 is a perspective view, partly in section, of a portion of a typical steam hose formed of a composition comprising a modified copolymer cured in accordance with the present invention.

Figure 5 shows a central longitudinal section broken away of a flexible rubber steam hose 27 produced in accordance with the present invention. Again, as in the case of the conveyor belt, the steam hose may consist wholly of chlorinated butyl rubber, but preferably contains embedded therein a cotton, rayon, nylon or steel fabric 28.

The expression "layer" as employed in the appended claims is intended to include plies and liners, as well as such layers as the carcass, sidewalls, tread area, etc., of tires.

The compositions comprising chlorinated isoolefin-multiolefin rubbery copolymers, which have been compounded and vulcanized in accordance with the present invention, may be employed alone or in admixture with other rubbers for a wide variety of applications other than those mentioned hereinbefore such as in electrical insulation, inner tubes, blown sponge rubber, car window channel strips, proofed goods and other applications where butyl rubber or certain chloroalkadiene rubber homopolymers or copolymers have utility.

Resort may be had to modifications and variations of the disclosed embodiments without departing from the spirit of the invention or the scope of the appended claims.

What is claimed is:

1. A composition which consists essentially of 100 parts by weight of chlorine-containing copolymers of an isoolefin having 4 to 8 carbon atoms and a multiolefin having 4 to 6 carbon atoms, said copolymer containing at least about 0.5 weight percent chlorine based on copolymer but not more than about one combined atom of chlorine per double bond in the copolymer, and about 0.5 to 30 parts by weight of zinc oxide, about 0.1 to 10 parts by weight of magnesium oxide, about 0.05 to 10 parts by weight of a thiazyl sulfide chosen from the group consisting of benzothiazyl disulfide, bis-4,5-dimethyl thiazyl disulfide, zinc benzothiazyl sulfide, dinitrophenyl benzothiazyl sulfide, benzyl hexamethylene tetrammonium-2-benzothiazyl sulfide, phenyl aminomethyl-2-benzothiazyl sulfide, and mixtures thereof, and about 0.1 to 10.0 parts by weight of a member selected from the group consisting of $C_1$ to $C_{10}$ alkyl, $C_6$ to $C_{12}$ aryl, $C_6$ to $C_{12}$ aralkyl and $C_6$ to $C_{12}$ alkaryl thiuram sulfides, metal salts of thiocarbamic acids, amine salts of thiocarbamic acids, and mixtures thereof, said composition being free of added elemental sulfur.

2. A composition according to claim 1 in which the thiuram sulfide is a $C_1$ to $C_{10}$ alkyl thiuram sulfide.

3. A composition according to claim 1 in which the thiocarbamate is a metal salt of dithiocarbamic acid.

4. A composition according to claim 1 in which the magnesium oxide is added first to the chlorinated copolymer, mixed at a temperature level of between about 130° and 350° F. for between about 5 seconds and 5 minutes with said copolymer, with the subsequent addition at a temperature level of between about 100° and 250° F. of the remaining ingredients.

5. A composition of a rubbery chlorine-containing copolymer of about 85 to 99.5 weight percent of a $C_4$ to $C_8$ isoolefin and about 15 to 0.5 weight percent of a $C_4$ to $C_6$ multiolefin, said copolymer containing at least about 0.5 weight percent chlorine but not more than about one combined atom of chlorine per double bond in the copolymer and having a Staudinger molecular weight of between about 20,000 and 150,000, said composition consisting essentially of 100 parts by weight of said chlorine-containing copolymer composited with about 0.3 to 5.0 parts by weight of magnesium oxide, about 1.0 to 20 parts by weight of zinc oxide, about 0.5 to 6.0 parts by weight of a thiazyl sulfide chosen from the group consisting of benzothiazyl disulfide, bis-4,5-dimethyl thiazyl disulfide, zinc benzothiazyl sulfide, dinitrophenyl benzothiazyl sulfide, benzyl hexamethylene tetrammonium-2-benzothiazyl sulfide, phenyl aminomethyl-2-benzothiazyl sulfide, and mixtures thereof, and about 0.3 to 4.0 parts by weight of a member selected from the group consisting of $C_1$ to $C_{10}$ alkyl, $C_6$ to $C_{12}$ aryl, $C_6$ to $C_{12}$ aralkyl and $C_6$ to $C_{12}$ alkaryl thiuram sulfides, metal salts of thiocarbamic acids, amine salts of thiocarbamic acids and mixtures thereof, said composition being free of added elemental sulfur.

6. A composition according to claim 5 in which the magnesium oxide has been blended in the substantial absence of other materials with the chlorine-containing polymer at a temperature level of between about 130° and 350° F. for between about 5 seconds and 5 minutes.

7. An improved process for vulcanizing a rubbery chlorine-containing copolymer of a $C_4$ to $C_8$ isoolefin and a $C_4$ to $C_6$ multiolefin, said copolymer containing at least about 0.5 weight percent chlorine but not more than one atom of combined chlorine per double bond in the copolymer, which comprises compounding said chlorinated copolymer with about 0.1 to 10.0 weight percent based on copolymer of magnesium oxide, mixing the chlorinated copolymer and magnesium oxide in the absence of added elemental sulfur at about 130° to 350° F. for between about 5 seconds and 5 minutes, regulating the resulting mixture to a temperature level of between about 130° and 220° F., compounding the resulting mixture in the absence of added elemental sulfur with about 0.5 to 30 weight percent of zinc oxide, about 0.5 to 10 parts by weight of a thiazyl sulfide chosen from the group consisting of benzothiazyl disulfide, bis-4,5-dimethyl thiazyl disulfide, zinc benzothiazyl sulfide, dinitrophenyl benzothiazyl sulfide, benzyl hexamethylene tetrammonium-2-benzothiazyl sulfide, phenyl aminomethyl-2-benzothiazyl sulfide, and mixtures thereof, and about 0.1 to 10 parts by weight of a member selected from the group consisting of $C_1$ to $C_{10}$ alkyl, $C_6$ to $C_{12}$ aryl, $C_6$ to $C_{12}$ aralkyl and $C_6$ to $C_{12}$ alkaryl thiuram sulfides, metal salts of thiocarbamic acids, amine salts of thiocarbamic acids, and mixtures thereof, and vulcanizing the compounded mixture formed at a temperature level of between about 250° and 400° F. for between about 0.1 minute and 5 hours.

8. A vulcanized product produced by the process of claim 7.

9. A composition according to claim 5 in which the chlorine-containing copolymer is an isobutylene-isoprene copolymer.

References Cited in the file of this patent

UNITED STATES PATENTS

| | | |
|---|---|---|
| 2,732,354 | Morrissey et al. | Jan. 24, 1956 |
| 2,804,448 | Hallenbeck | Aug. 27, 1957 |

OTHER REFERENCES

Barron: "Modern Synthetic Rubbers," page 437 (1949), 3rd edition, Chapman & Hall Ltd., London.

S. S. Rogers: "The Vanderbilt 1948 Rubber Handbook," Vanderbilt Pub. Co., N.Y. (1948), pages 47, 124, 125, 358 and 359.

Whitby: "Synthetic Rubber," Wiley & Sons, N.Y. (1954), pages 776, 777, and 781.

UNITED STATES PATENT OFFICE
CERTIFICATE OF CORRECTION

Patent No. 2,955,102

October 4, 1960

Robert E. Clayton et al.

It is hereby certified that error appears in the above numbered patent requiring correction and that the said Letters Patent should read as corrected below.

Column 1, line 23, for "thiocarbonates" read -- thiocarbamates --.

Signed and sealed this 25th day of September 1962.

(SEAL)
Attest:

ERNEST W. SWIDER
Attesting Officer

DAVID L. LADD
Commissioner of Patents